United States Patent
Yasuhira et al.

[11] Patent Number: 5,619,783
[45] Date of Patent: Apr. 15, 1997

[54] METHOD FOR SETTING CUTTING TOOL

[75] Inventors: Nobuo Yasuhira, Hirakata; Shuji Ueda, Neyagawa, both of Japan

[73] Assignee: Matsushita Electric Industrial Co., Ltd., Osaka-fu, Japan

[21] Appl. No.: 364,117

[22] Filed: Dec. 27, 1994

[30]      Foreign Application Priority Data

Dec. 28, 1993   [JP]   Japan ................................. 5-336227

[51] Int. Cl.⁶ .................................................. B23Q 17/00
[52] U.S. Cl. .................... 29/407.04; 29/407.09; 356/358
[58] Field of Search ........................... 29/407, 466, 468, 29/720, 407.01, 407.04, 407.09; 356/363, 358

[56]              References Cited

U.S. PATENT DOCUMENTS 4,460,275   7/1984   Spriggs ................................. 356/363

Primary Examiner—David P. Bryant
Attorney, Agent, or Firm—Wenderoth Lind & Ponack

[57]                ABSTRACT

A cutting tool is fixed to a cutting tool holder in such a manner that the posture of the cutting tool can be adjusted without being removed from a processing machine. The cutting tool holder is fixed to a fixing base to allow the cutting tool holder to be fixed in the same position thereof repeatedly with high reproducibility. After the flank of the cutting edge of the cutting tool is measured by an objective interference microscope, the posture of the cutting tool with respect to the cutting tool holder is adjusted so that an interference fringe coincides with a predetermined interference fringe.

10 Claims, 10 Drawing Sheets

Fig./3A
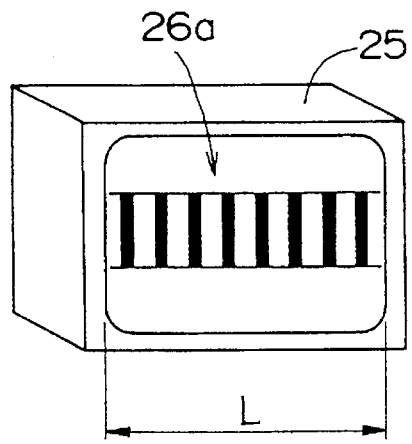
Fig./3D
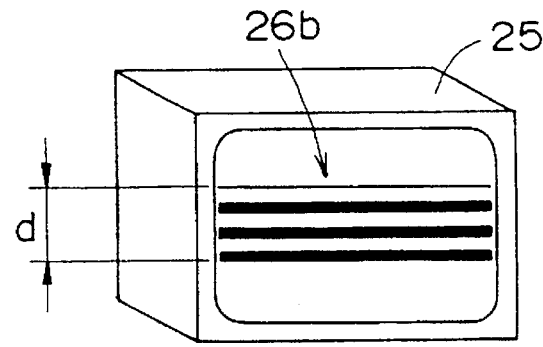
Fig./3B
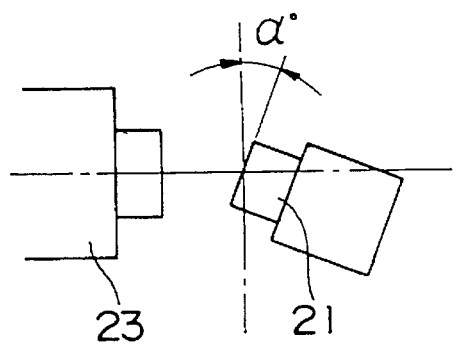
Fig./3E
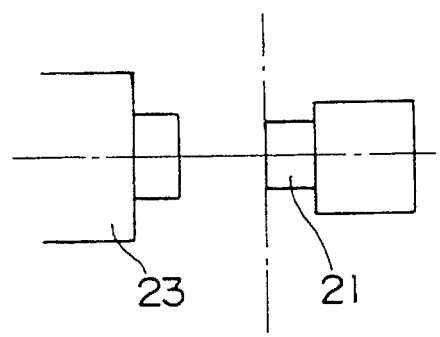
Fig./3C
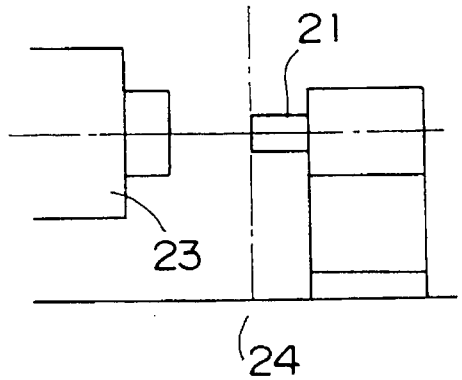
Fig./3F
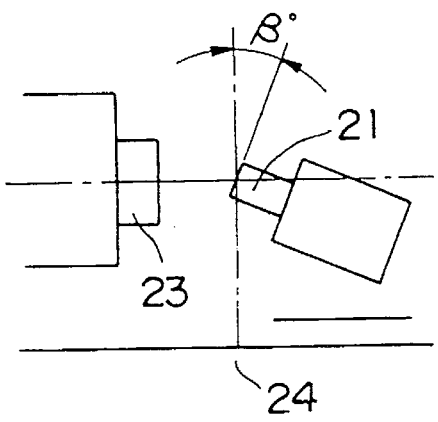

METHOD FOR SETTING CUTTING TOOL

BACKGROUND OF THE INVENTION

The present invention relates to a cutting tool-setting apparatus and method to be used in a cutting process, such as a turning process or a flying cutter process, for transferring a motion trace to the surface of a material to be cut (hereinafter abbreviated as workpiece) by a relative motion between the workpiece and the cutting tool for performing a mirror finished surface cutting of the workpiece (hereinafter abbreviated as tool).

In recent years, there have been demands for a highly accurate setting of a cutting tool, in particular, in a process for mirror finished surface cutting (S.P.D.T: single point diamond turning). Thus, the cutting process depends on a skilled worker's manual work on an apparatus in operation.

A conventional method of setting a cutting tool is described below.

FIGS. 11 and 12 show a conventional method of setting the cutting tool.

FIGS. 11 and 12 show a partial plan and front view showing a processing machine for performing a turning process.

In FIG. 11, reference numeral 61 denotes a cutting tool; 62 denotes a workpiece; 63 denotes a chuck for chucking a workpiece-rotating shaft and having a function of holding the workpiece 12 at both ends thereof and rotating it; 64 denotes a tool-fixing base; 65 denotes a fixing screw for adjusting the posture of the cutting tool 61 in the X-direction and fixing it to the tool-fixing base 64; and 66 denotes a fixing screw for adjusting the posture of the cutting tool 61 in the Z-direction and fixing it to the tool-fixing base 64. The cutting tool 61 can be fixed to the tool-fixing base 64 with the fixing screws 65 and 66. Reference numeral 67 denotes a feeding table; 68 denotes a fixing screw for adjusting the posture of the cutting tool 61 in the θ-direction and fixing it to the tool-fixing base 64; 69 denotes a feeding guide; and 70 denotes a feeding direction. The cutting tool 61 is moved in the feeding direction 70 by fixing the tool-fixing base 64 to the feeding table 67 and moving the feeding table 67 straight along the feeding guide 69. The cutting tool 61 is fed in the feeding direction 70 with the cutting tool 61 operating on the rotating workpiece 62. In this manner, the surface of the workpiece 62 is processed. In order to obtain a mirror finished surface, it is necessary to maintain the positional relationship (at a level of several μm) and angle relationship (at a level of several seconds) between the posture of the cutting tool 61 and the workpiece-rotating shaft with high accuracy. To this end, a worker skilled in processing the surface of the workpiece 62 to a mirror finished surface secures the posture of the cutting tool for performing the mirror finished surface work by adjusting the fixing screws 65, 66, and 68 while the worker is processing the surface of the workpiece 62 on the processing machine, based on the worker's sense and experience.

However, in the above-described conventional construction, the worker's sense and experience is greatly relied upon. In addition, it is necessary for the worker to perform the screw-adjusting operation on the processing machine. Thus, there are problems that the operation lacks reproducibility, thus lowering the operating efficiency of the processing machine.

SUMMARY OF THE INVENTION

It is accordingly an object of the present invention to provide an apparatus and a method for setting a cutting tool which does not require skilled work in adjusting the posture of the cutting tool.

In order to achieve the aforementioned object, according to one aspect of the present invention, there is provided a cutting tool-setting apparatus comprising:

a cutting tool holder which is mounted on a processing machine for performing a cutting process for cutting a workpiece by using a cutting tool and to which the cutting tool is fixed in such a manner that a posture of the cutting tool can be adjusted;

a posture detecting means for detecting the posture of the cutting tool on the basis of an interference fringe generated based on light reflected on the cutting tool fixed to the cutting tool holder; and a fixing means allowing the cutting tool holder to be fixed in a predetermined position thereof with respect to the posture detecting means.

Further, according to another aspect of the present invention, there is provided a cutting tool-setting method comprising the steps of:

fixing a cutting tool to a cutting tool holder mounted on a processing machine for performing a cutting process for cutting a workpiece by using the cutting tool in such a manner that a posture of the cutting tool can be adjusted;

fixing the cutting tool holder in a predetermined position by a fixing means; and displaying, on a monitor, an interference fringe corresponding to the posture of the cutting tool fixed to the cutting tool holder by means of a posture detecting means for detecting the posture of the cutting tool on the basis of the interference fringe generated based on light reflected on the cutting tool fixed to the cutting tool holder fixed in the predetermined position by the fixing means, and adjusting the posture of the cutting tool with respect to the cutting tool holder so that the interference fringe displayed on the monitor can coincide with a predetermined one.

BRIEF DESCRIPTION OF THE DRAWINGS

These and other objects and features of the present invention will become clear from the following description taken in conjunction with the preferred embodiments thereof with reference to the accompanying drawings, in which:

FIG. 13A is an explanatory view showing a state in which in a horizontal direction, a cutting tool is inclined by α° with respect to the optical axis of an objective interference microscope and also showing an example of a vertical interference fringe displayed on a monitor;

FIG. 13B is a plan view showing the positional relationship between the cutting tool and the objective interference microscope;

FIG. 13C is a side view showing the position relationship between the cutting tool and the objective interference microscope;

FIG. 13D is an explanatory view showing a state in which in a vertical direction, the cutting tool is inclined by β° with respect to a vertical axis of the objective interference microscope and also showing an example of a lateral interference fringe displayed on the monitor;

FIG. 13E is a plan view showing the positional relationship between the cutting tool and the objective interference microscope;

FIG. 13F is a side view showing the positional relationship between the cutting tool and the objective interference microscope;

DETAILED DESCRIPTION OF THE EMBODIMENTS

Figure 1:
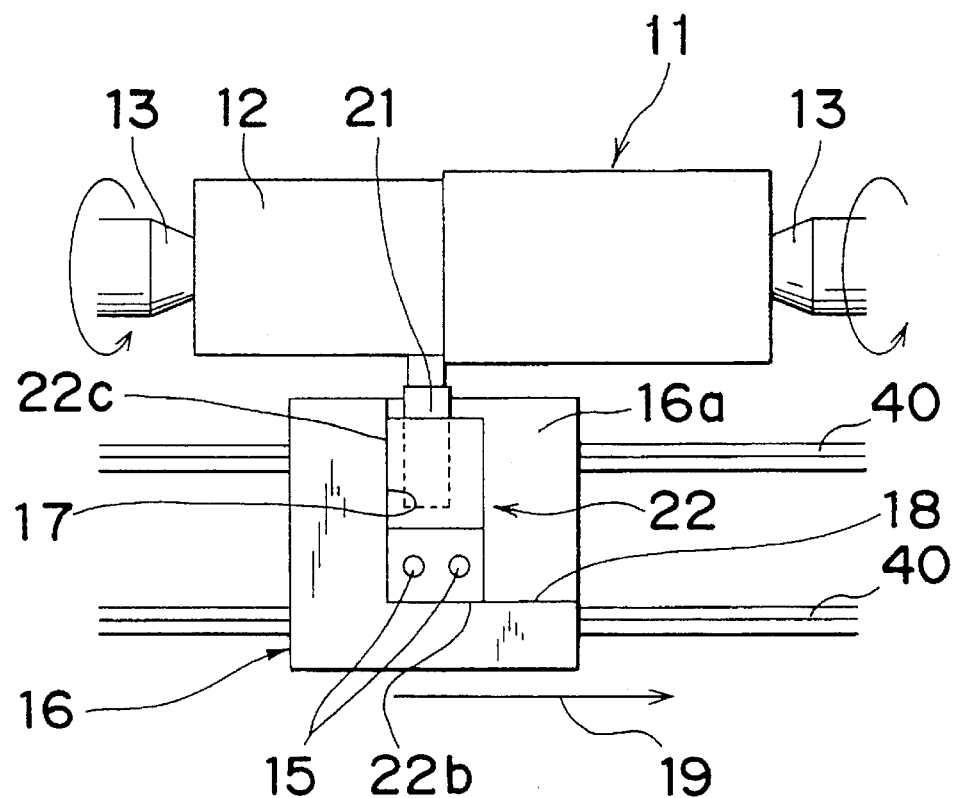
FIG. 1 is a partial front view showing a processing machine which performs a turning process by using a cutting tool, the posture of which is adjusted by a cutting tool-setting apparatus according to an embodiment of the present invention.

Before the description of the present invention proceeds, it is to be noted that like parts are designated by like reference numerals throughout the accompanying drawings.

Embodiments of the present invention are described below with reference to the drawings.

Figure 2:
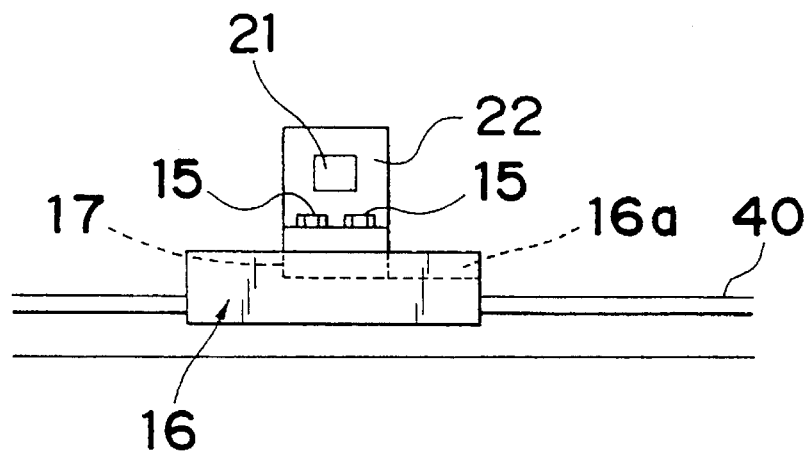
FIG. 2 is a partial plan view showing the processing machine shown in FIG. 1.

FIGS. 1 and 2 are a partial plan view and a partial front view, respectively showing a processing machine 11 for performing a predetermined cutting process, for example, a turning process for turning a workpiece 12 by means of a cutting tool 21 set on a cutting tool holder 22 removably mounted on a cutting tool-setting apparatus according to an embodiment of the present invention.

In FIGS. 1 and 2, 21 denotes the cutting tool made of diamond, super alloy or the like; 12 denotes a workpiece made of soft metal such as aluminum or copper; 13 denotes the chuck, for chucking a workpiece-rotating shaft, installed on the processing machine 11 and having a function of holding the workpiece 12 at both ends thereof and rotating it; and 22 denotes the cutting tool holder for holding the cutting tool 11 such that the posture of the cutting tool 21 can be adjusted three-dimensionally and having a first positioning plane 22a (see FIG. 4), a second positioning plane 22b, and a third positioning plane 22c. The first positioning plane 22a and the third positioning plane 22c extend in parallel with the center axis of the cutting tool holder 22, while the second positioning plane 22b extends at right angles with the first positioning plane 22a and the third positioning plane 22c. Reference numerals 15 denotes fixing screws; 16 denotes a feeding table shown as an example of a feeding means used to fix the cutting tool holder 22 to a fixing portion 16a thereof with the fixing screws 15 and 15; 17 denotes a contact surface X for positioning, with which the cutting tool holder 22 is brought into contact, to be used when the cutting tool holder 22 is fixed to the fixing portion 16a of the feeding table 16; and 18 denotes a contact surface Y for positioning, with which the cutting tool holder 22 is brought into contact, which is perpendicular to the contact surface X, with which the cutting tool holder 22 is brought into contact. The cutting tool holder 22 is fixed to the feeding table 16 with the two fixing screws 15 and 15, with the second positioning plane 22b and the third positioning plane 22c in contact with the contact surfaces 18 and 17, respectively, and moved in a feeding direction 19 together with the feeding table 16 under the guide of feeding guides 40 and 40.

In the processing machine 11, the surface of the workpiece 12 is processed by rotating the workpiece 12 held by the two chucks 13 and 13 and moving the cutting tool 12 in the feeding direction 19 under the guide of the feeding guides 40 and 40 with the cutting tool 21 working on the workpiece 12. The posture of the cutting edge of the cutting tool 21 is adjusted with respect to the cutting tool holder 22 with the positions of the contact surfaces 17 and 18 previously set as reference. Therefore, immediately after the cutting tool holder 22 is replaced, an operation for processing the surface of the workpiece 12 into a mirror finished surface can be started.

The cutting tool-setting apparatus according to the embodiment, and the method of adjusting the posture of the cutting tool by using the apparatus, in other words, the method of adjusting the cutting edge of the cutting tool, are described below with reference to FIGS. 3, 4, 5, and 6.

Figure 3:
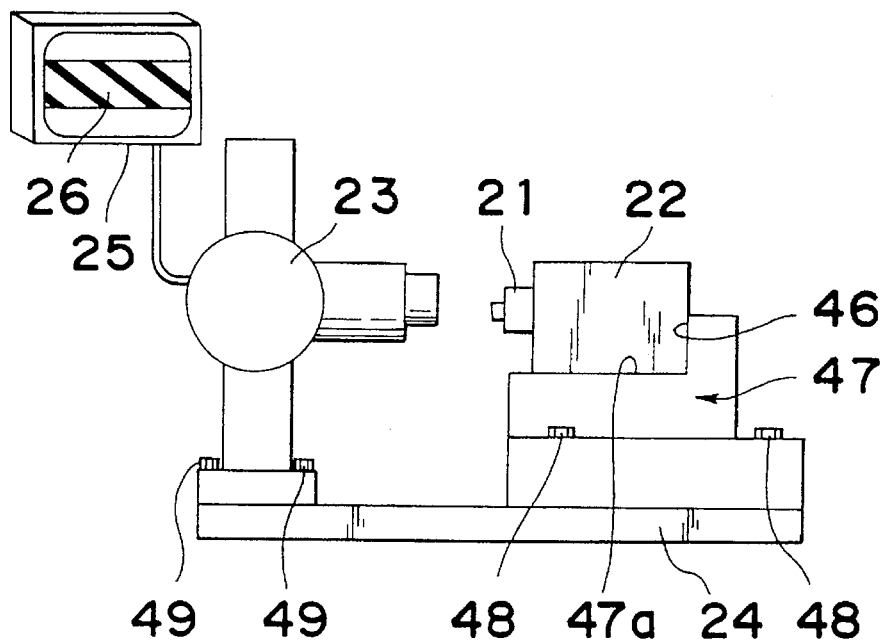
FIG. 3 is a front view showing the cutting tool-setting apparatus according to the above-described embodiment of the present invention.
Figure 5:
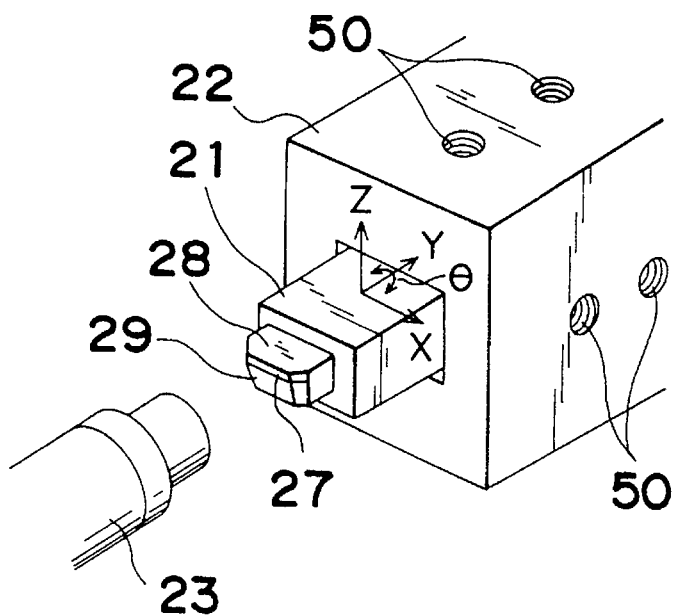
FIG. 5 is a partial enlarged view showing a portion in which an objective interference microscope of the cutting tool-setting apparatus according to the above-described embodiment of the present invention confronts a cutting edge of the cutting tool fixed to a cutting tool holder.
Figure 4:
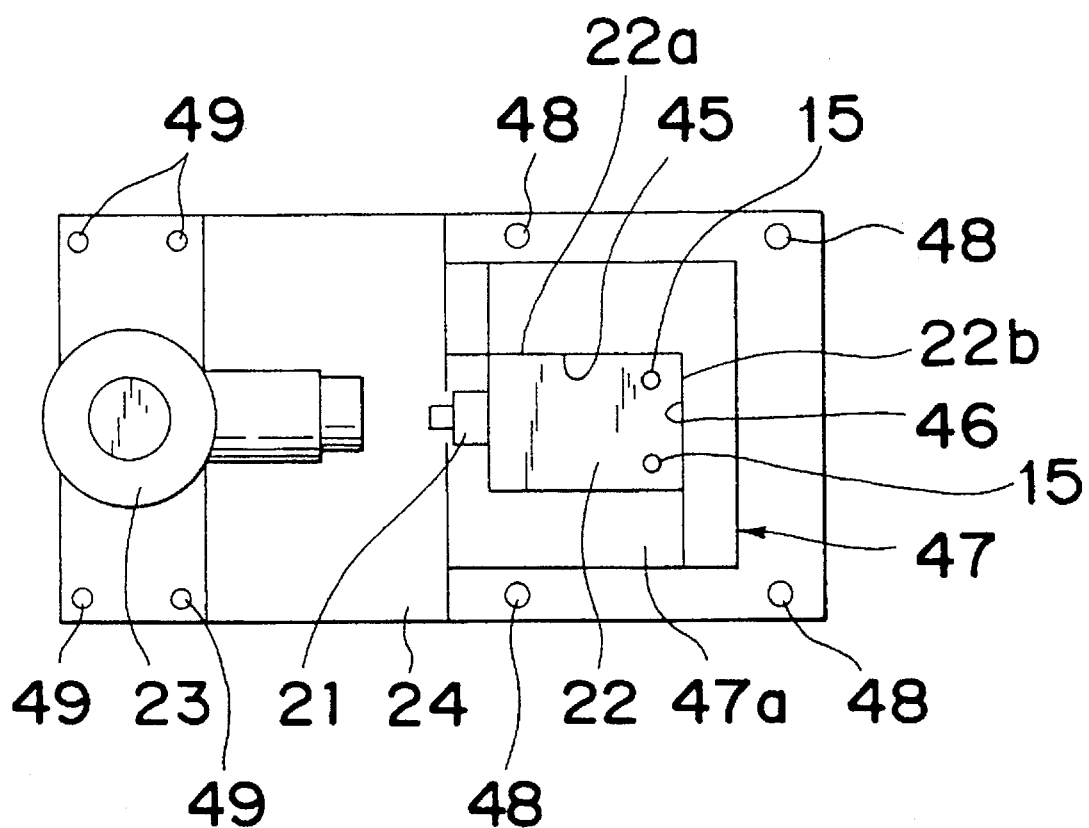
FIG. 4 is a plan view showing the cutting tool-setting apparatus shown in FIG. 3.

FIGS. 3 and 4 are a front view and a plan view showing the cutting tool-setting apparatus according to the embodiment of the present invention. FIG. 5 is an enlarged view showing the edge of the cutting tool of the cutting tool-setting apparatus. In FIGS. 3 and 4, reference numeral 21 denotes the cutting tool; 22 denotes the cutting tool holder capable of adjusting the three-dimensional posture of the cutting tool 21 and fixing it thereto; 23 denotes an objective interference microscope shown as an example of a means for detecting the posture of the cutting tool 21; 24 denotes a fixing base shown as an example of a fixing means allowing the cutting tool holder 22 to be repeatedly fixed to the same position thereof with high reproducibility with respect to the objective interference microscope 23; 25 denotes a monitor; and 26 denotes an interference fringe displayed on the monitor 25. In FIG. 5, 27 denotes a first flank of the cutting edge of the cutting tool 21; 28 denotes the rake face of the cutting edge; and 29 denotes a second flank of the cutting edge.

The objective interference microscope 23 is fixed to one end of the fixing base 24 with the fixing screws 49, . . . , 49 while a positioning member 47 is fixed to the other end thereof with the fixing screws 48, ..., 48. The positioning member 47 has, in the periphery of a positioning plane 47a, a first plane 45 substantially parallel with the optical axis of light projected from a light source incorporated in the objective interference microscope 23 to the cutting tool 21 held by the cutting tool holder 22, and a second plane 46 perpendicular to the first plane 45. The cutting tool holder 22 is positioned at a predetermined position with respect to the objective interference microscope 23 via the positioning member 47 with the first positioning plane 22a of the cutting tool holder 22 and the second positioning plane 22b thereof being brought into contact with the first plane 45 of the positioning member 47 and the second plane 46 thereof, respectively.

Figure 6:
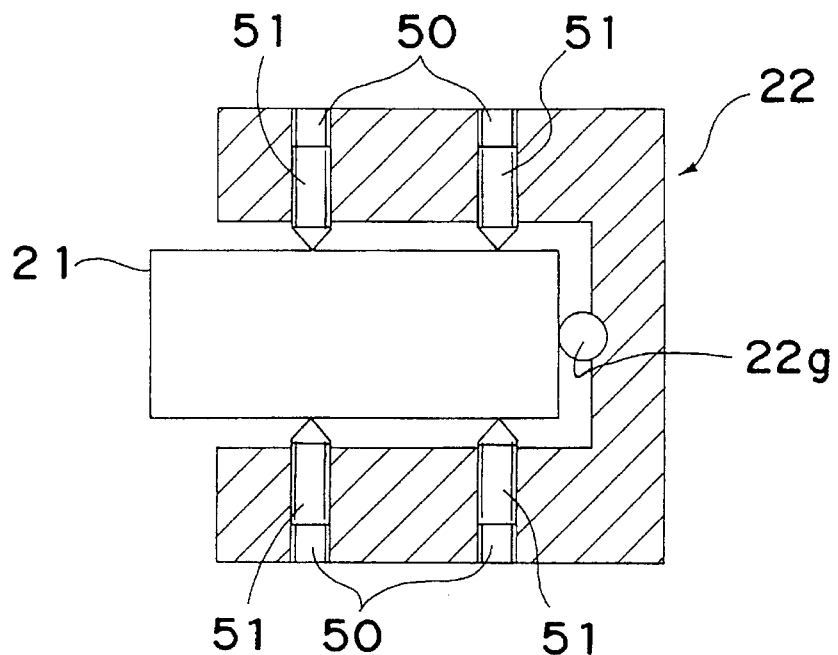
FIG. 6 is a sectional side view showing the cutting tool holder.

FIG. 6 is a schematic sectional side view showing the cutting tool holder 22 to which the cutting tool 21 has been fixed. The cutting tool 21 is fitted into a recess of the cutting tool holder 22, and the bottom of the cutting tool 21 is brought into contact with a positioning ball 22g provided on the bottom surface of the recess so as to determine the position of the cutting tool 21 in its axial direction (position in the Y-direction in FIG. 5). The position of the cutting tool 21 in its Z-direction of FIG. 5 with respect to the cutting tool holder 22 can be adjusted by forming, on the cutting tool holder 22, female holes 50, ..., 50 into which two upper adjusting screws and two lower adjusting screws 51, ..., 51 shown in FIG. 6 are tightened and by adjusting the tightening extent of the two upper and lower adjusting screws 51, ..., 51, totaling four adjusting screws. More specifically, by tightening the upper left adjusting screw 51 of FIG. 6 downward and loosening the lower left adjusting screw 51 to move the lower left adjusting screw 51 downward, the leading end of the cutting tool 21 is inclined downward a little with respect to the cutting tool holder 22. Similarly, the position of the cutting tool 21 in the X-direction of FIG. 5 can be also adjusted by tightening the four adjusting screws 51, ..., 51 into the four female holes 50, ..., 50 and/or loosening them.

Figure 7:
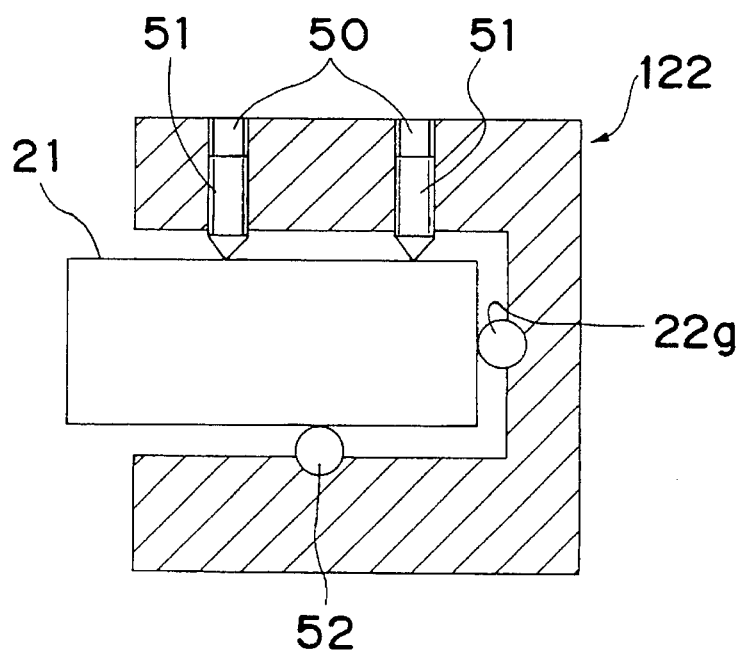
FIG. 7 is a sectional side view showing a cutting tool holder of a cutting tool-setting apparatus according to another embodiment of the present invention.

FIG. 7 shows an example of a cutting tool holder 122 according to an embodiment different from the embodiment shown in FIG. 6. In this embodiment, in a certain direction, for example, in the Z-direction, the cutting tool holder 122 has two adjusting screws 51 and 51 provided on the upper side thereof as in the case of the holder 22 of FIG. 6, and has, on the lower side thereof, a cylindrical rotary ball 52 at a position midway between the two adjusting screws 51 and 51. By tightening one of the two upper adjusting screws 51 and 51, for example, the left adjusting screw 51 downward, the cutting tool 21 is pivoted a little counterclockwise around the rotary ball 52. As a result, the leading end of the cutting tool 21 is inclined downward a little with respect to the cutting tool holder 22. Thus, in this embodiment, the number of the adjusting screws 51 to be adjusted can be small.

When the posture of the cutting tool 21 is detected by the objective interference microscope 23, the configuration and number of the interference fringes 26 to be displayed on the monitor 25 through the objective interference microscope 23 are determined with a one-to-one correspondence in correspondence to the position and angle of the first flank 27 of the cutting edge at which the surface of the workpiece 12 can be cut to a mirror finished surface. Accordingly, when the posture of the cutting tool 21 is adjusted to the position and the angle at which the surface of the workpiece 12 can be cut to a mirror finished surface, the posture of a teaching cutting tool at which the surface of the workpiece 12 can be processed into a mirror finished surface is previously determined by using the teaching cutting tool, and then an operation to adjust the configuration and number of the interference fringe 26 of the first flank 27 of the cutting edge of the to-be-adjusted cutting tool 21 to the same configuration and number as those of the teaching cutting tool is performed. By fixing the cutting tool holder 22 to the fixing base 24 with the fixing screws 15 and 15, with the first positioning plane 22a of the cutting tool holder 22 and the second positioning plane 22b thereof in contact with the first plane 45 of the positioning member 47 fixed to the fixing base 24 and the second plane 46 of the positioning member 47, respectively with high accuracy, the position and angle of the first flank 27 of the cutting edge of the cutting tool 21 can be adjusted with high accuracy (10 µm or less, within five seconds) because the cutting tool holder 22 can be fixed in the same position of the fixing base 24 repeatedly with high reproducibility.

A specific example of the interference fringe 26 is shown in FIG. 13. FIGS. 13A through 13C show a state in which in the horizontal direction, the cutting tool 21 is inclined by an angle α with respect to the optical axis of the objective interference microscope 23. FIG. 13A is an explanatory view showing an example of a vertical interference fringe 26a displayed on the monitor 25, and FIGS. 13B and 13C are plan and side views showing the cutting tool 21 and the objective interference microscope 23, respectively. FIG. 13D through 13F show states in which in the vertical direction, the cutting tool 21 is inclined by an angle β with respect to the vertical axis of the objective interference microscope 23. FIG. 13D is an explanatory view showing an example of a lateral interference fringe 26b displayed on the monitor 25, and FIGS. 13E and 13F are plan and side views showing the cutting tool 21 and the objective interference microscope 23, respectively.

Supposing that the entire width of the vertical interference fringe 26a on the screen of the monitor 25, in other words, the range of the cutting tool 21 on the screen of the monitor 25 is L(mm), the height of the lateral interference fringe 26b is d, the number of the vertical interference fringes 26a or the number of the lateral interference fringes 26b on the screen of the monitor 25 is N, and the wavelength of the light source incorporated in the objective interference microscope 23 is λ(mm), an expression of tan $\alpha = (N_1 \lambda)/L$ is established in the example of FIGS. 13A through 13C, and tan $\beta = (N_2 \lambda)/d$ is established in the example of FIGS. 13D through 13F. More specifically, supposing that N=three, $\lambda = 6 \times 10^{-4}$ mm, and L=10 mm, α=37 seconds (0.01°).

A method of adjusting the interference fringe 26 is specifically described below.

Figure 14:
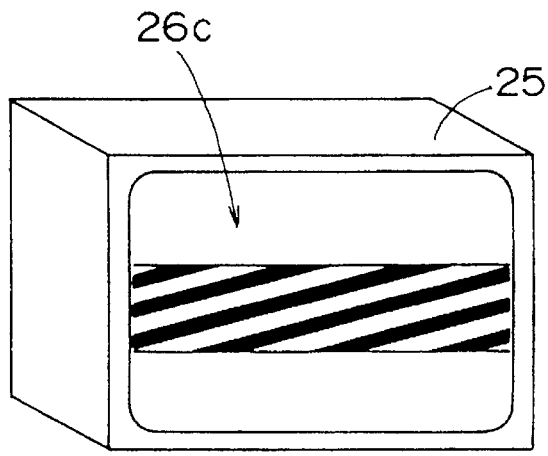
FIG. 14 is an explanatory view showing an example of an interference fringe displayed on the monitor.

Let it be supposed that an interference fringe 26c as shown in FIG. 14 is displayed on the monitor 25. At this time, the number of the vertical fringes can be regarded as four, while the number of the lateral fringes can be regarded as three. In this case, $\lambda = 6 \times 10^{-4}$ mm. Thus, the dislocation (dislocation angle α°) in the horizontal direction is: tan $\alpha = (N_1 \lambda)/L = (4 \times 6 \times 10^{-4})/10$. Accordingly, α=49 seconds. The dislocation in the vertical direction (dislocation angle β°) is: tan $\beta = (N_2 \lambda)/d = (3 \times 6 \times 10^{-4})/4$. Accordingly, β=93 seconds. Based on the dislocations of the angle in the horizontal and vertical directions, the posture of the cutting tool 21 is adjusted with respect to the cutting tool holder 22 with the adjusting screws 51, ..., 51 so as to correct the dislocations.

Figure 15:
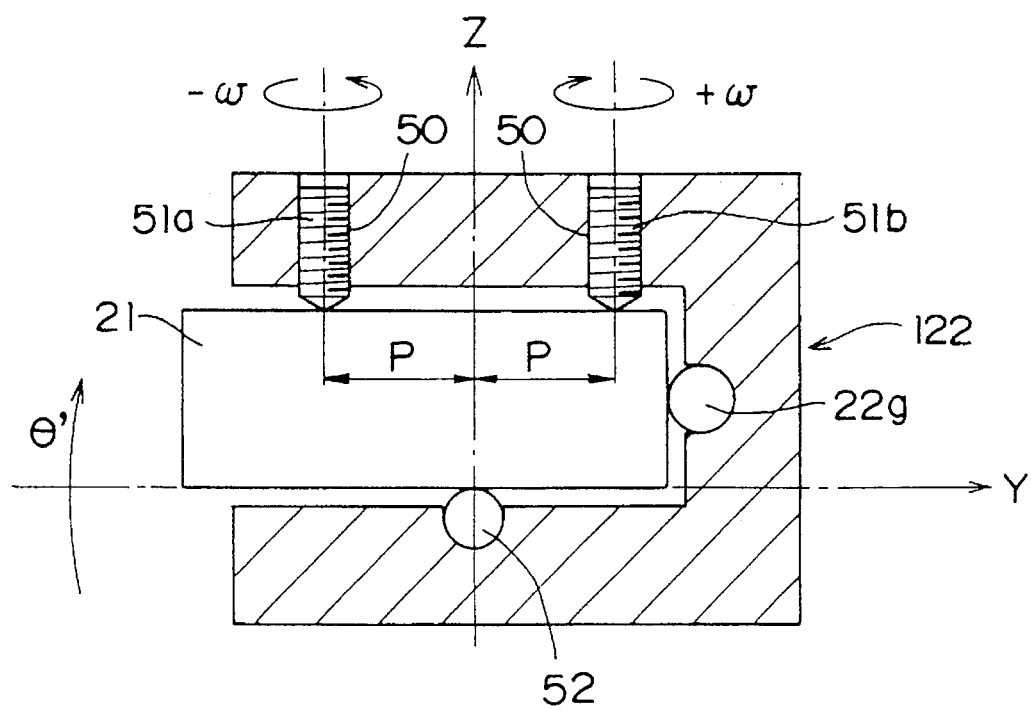
FIG. 15 is an explanatory view for explaining a method of adjusting the posture of the cutting tool to be carried out by means of two adjusting screws.

FIG. 15 shows a specific method of adjusting the posture of the cutting tool 21 by means of the adjusting screws 51, ..., 51.

In FIG. 15, reference numerals 51a and 51b denote adjusting screws. The movement amounts (leads) of the adjusting screws 51a and 51b per rotation thereof are both (a) mm. Reference numeral 52 denotes an adjusting rotary ball for fulcrum, 22g denotes a positioning ball; P is the distance in the Y-direction (axial direction of cutting tool holder 22) from the center of the adjusting rotary ball 52 to the rotational axis of each of the adjusting screws 51a and 51b; and θ' is an angle to be adjusted by the adjusting screws 51a and 51b; and ω is the screwing angle (°) of each of the adjusting screws 51a and 51b. The adjustment can be easily performed by setting the leads (a) to the same amount. Further, the adjustment can be easily performed by setting the distance (P) from the adjusting rotary ball 52 to the adjusting screw 51a to be equal to the distance (P) from the adjusting rotary ball 52 to the adjusting screw 51b. When the adjusting screws 51a and 51b rotate in opposite directions and in the same amount, the absolute angle of the adjusting screw 51a becomes the same as that of the adjusting screw 51b, supposing that the lead (a) of the adjusting screw 51a is equal to that of the adjusting screw 51b and that the distance (P) from the adjusting rotary ball 52 to the adjusting screw 51a is equal to that from the adjusting rotary ball 52 to the adjusting screw 51b.

$$\{a \times (\omega/360)\}/P = \tan\theta$$

$$\omega = (360 \times P \times \tan\theta)/a$$

Thus, by rotating the adjusting screw 51a by $-\omega°$ and the adjusting screw 51b by $\omega°$, the cutting tool 21 is placed in position in the axial direction of the cutting tool holder 22 with respect to the adjusting rotary ball 52, with the cutting tool 21 inserted in the cutting tool holder 22.

Figure 8:
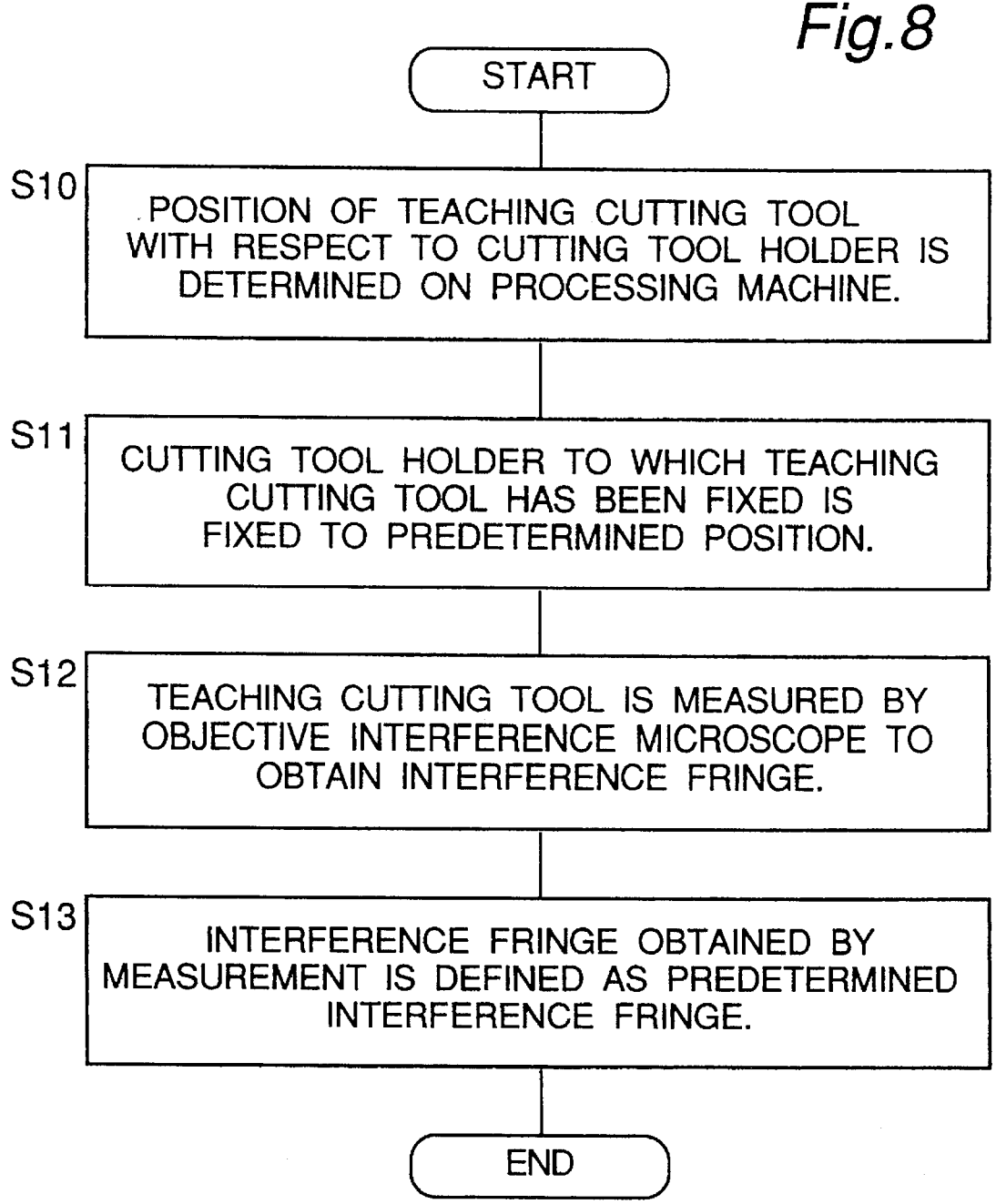
FIG. 8 is a flowchart showing a teaching operation of a cutting tool-setting method to be performed by the above apparatus.

Next, the detail of the method of adjusting the posture of the cutting tool according to this embodiment is described below. Initially, a teaching operation is performed by using a teaching cutting tool as shown in FIG. 8. Then, based on the result obtained by the teaching operation, the adjustment of the cutting edge of the cutting tool is performed.

At step S10, the cutting tool holder 22 is set on the processing machine 11 with the teaching cutting tool (same construction as that of the cutting tool 21) fixed to the cutting tool holder 22, and the posture of the teaching cutting tool with respect to the cutting tool holder 22 is adjusted so that the workpiece 12 can be subjected to a desired cutting work. In this manner, the posture of the teaching cutting tool is determined with respect to the cutting tool holder 22.

Then, at step S11, the cutting tool holder 22 to which the teaching cutting tool has been fixed is fixed to the predetermined position of the positioning member 47 fixed to the fixing base 24.

Then, at step S12, the teaching cutting tool is measured by the objective interference microscope 23 to obtain an interference fringe. That is, an interference is generated between light emitted by the light source incorporated in the objective interference microscope 23 and light obtained by the reflection of the light emitted by the light source on a to-be-measured surface of the teaching cutting tool, for example, the flank of the cutting edge of the teaching cutting tool, so as to obtain the interference fringe 26.

At step S13, the interference fringe 26 obtained by the measurement is defined as a predetermined one. That is, when the cutting tool 21 fixed to the cutting tool holder 22 has an interference fringe substantially the same as the predetermined one, it can be decided that the cutting tool 21 has been fixed in a desired position with respect to the cutting tool holder 22. In other words, it is decided that the cutting tool 21 has been fixed in the same position of the cutting tool holder 22 as that of the teaching cutting tool. Thus, desired cutting work can be performed.

Figure 9:
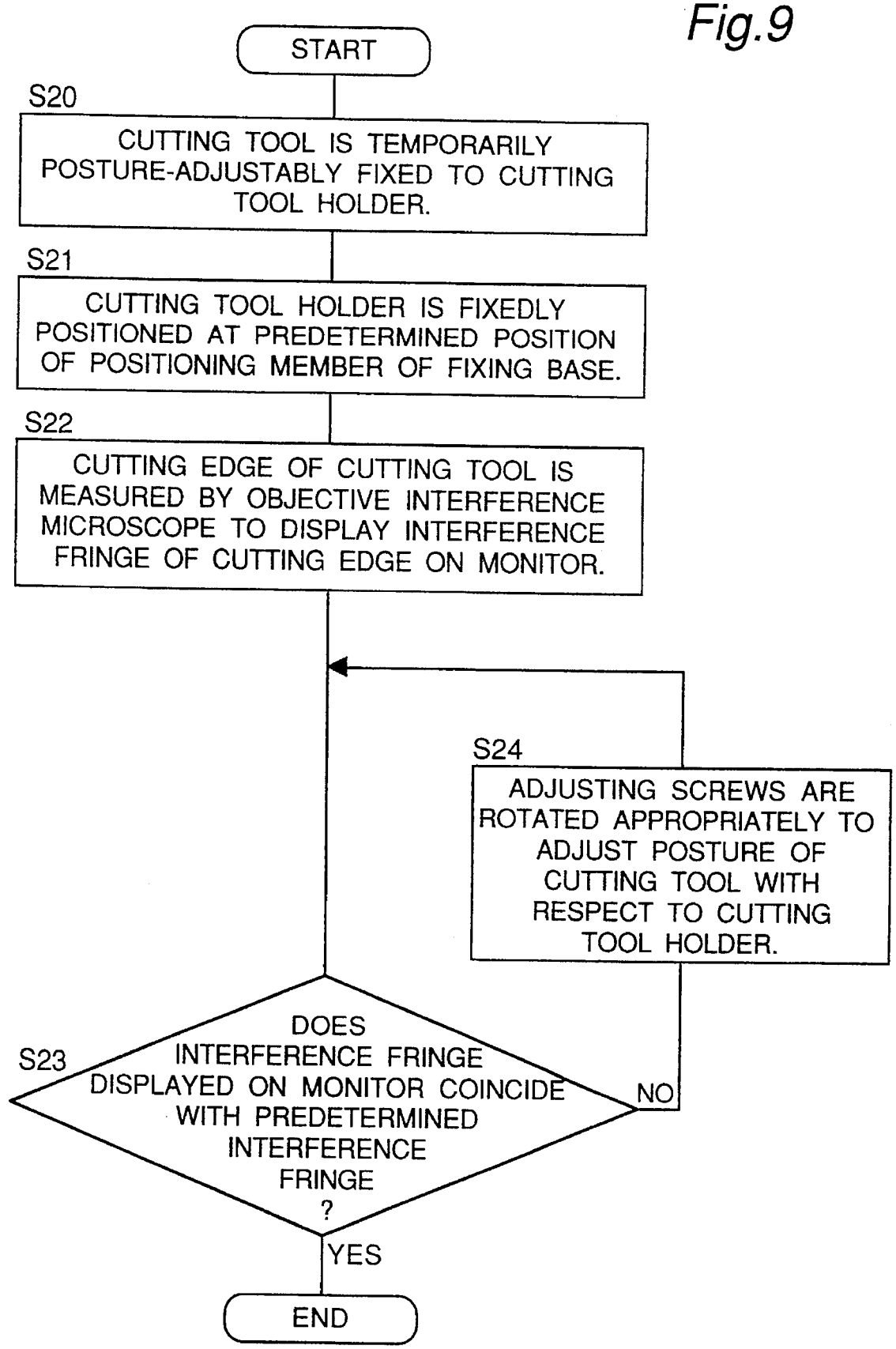
FIG. 9 is a flowchart showing a posture-adjusting operation in the cutting tool-setting method to be performed by the above apparatus.

After the teaching operation is terminated, the posture adjustment of the cutting tool 21 actually being used is described below with reference to FIG. 9.

At step S20, the cutting tool 21 is temporarily posture-adjustably fixed to the cutting tool holder 22 with the adjusting screws 51, . . . , 51.

At step S21, the cutting tool holder 22 is fixedly positioned at the predetermined position of the positioning member 47 fixed to the fixing base 24.

At step S22, the first flank 27 of the cutting edge of the cutting tool 21 fixed to the cutting tool holder 22 is measured by the objective interference microscope 23, and the interference fringe 26 of the first flank 27 is displayed on the monitor 25. Then, at step S23, an operator discriminates visually whether or not the interference fringe displayed on the monitor 25 coincides with the predetermined one. If it is decided at step S23 that the interference fringe 26 has not coincided with the predetermined one, the adjusting screws 51, . . . , 51 are rotated appropriately to adjust the posture of the cutting tool 21 with respect to the cutting tool holder 22 at step S24. Then, at step S23, it is decided again whether or not the interference fringe 26 displayed on the monitor 25 has coincided with the predetermined one. If it is decided at step S23 that the interference fringe 26 has coincided with the predetermined one, it means that the posture of the cutting tool 21 has been adjusted to the predetermined posture of the cutting tool holder 22. Thus, the adjusting operation is completed.

Figure 11:
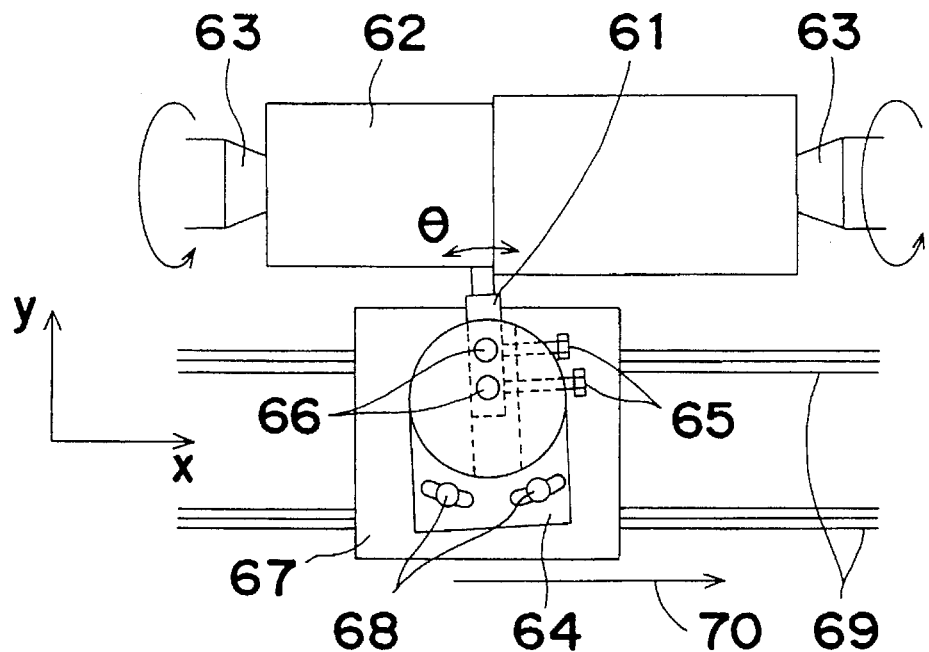
FIG. 11 is a partial plan view, showing a processing machine, for describing a conventional cutting tool-setting method.
Figure 12:
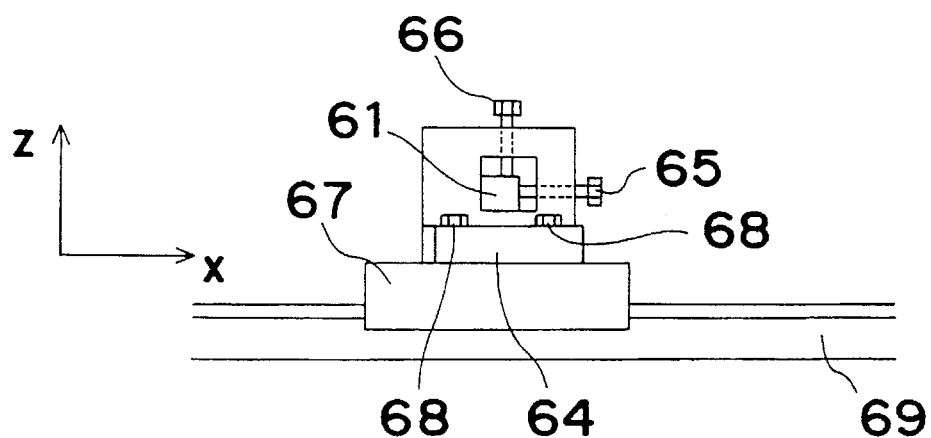
FIG. 12 is a front view showing the processing machine shown in FIG. 11.

Table 1 shown below indicates the characteristics of the cutting tool set by the cutting tool-setting apparatus according to this embodiment and characteristics of the cutting tool set by the conventional cutting tool-setting method shown in FIGS. 11 and 12.

TABLE 1

| Formation of mirror finished surface processing | | Method according to embodiment | Conventional method |
| --- | --- | --- | --- |
| Method | | Objective adjusting method with interference microscope | Manual operation based on skilled worker's sense & experience |
| Degree of accuracy | position of cutting edge | ±10 μm | ±10 μm |
| | angle of cutting edge | ±5 seconds | ±10 seconds |
| Adjustment number of times on apparatus | | one time | 5–20 times |
| Equipment operating efficiency | | 95% | 85% |

As apparent from table 1, the cutting tool set by the cutting tool-setting apparatus according to this embodiment has the excellent effects of reducing the number of the adjustment times on the processing machine and improving the equipment operating efficiency, as compared with the cutting tool set by the conventional cutting tool-setting method.

Figure 10:
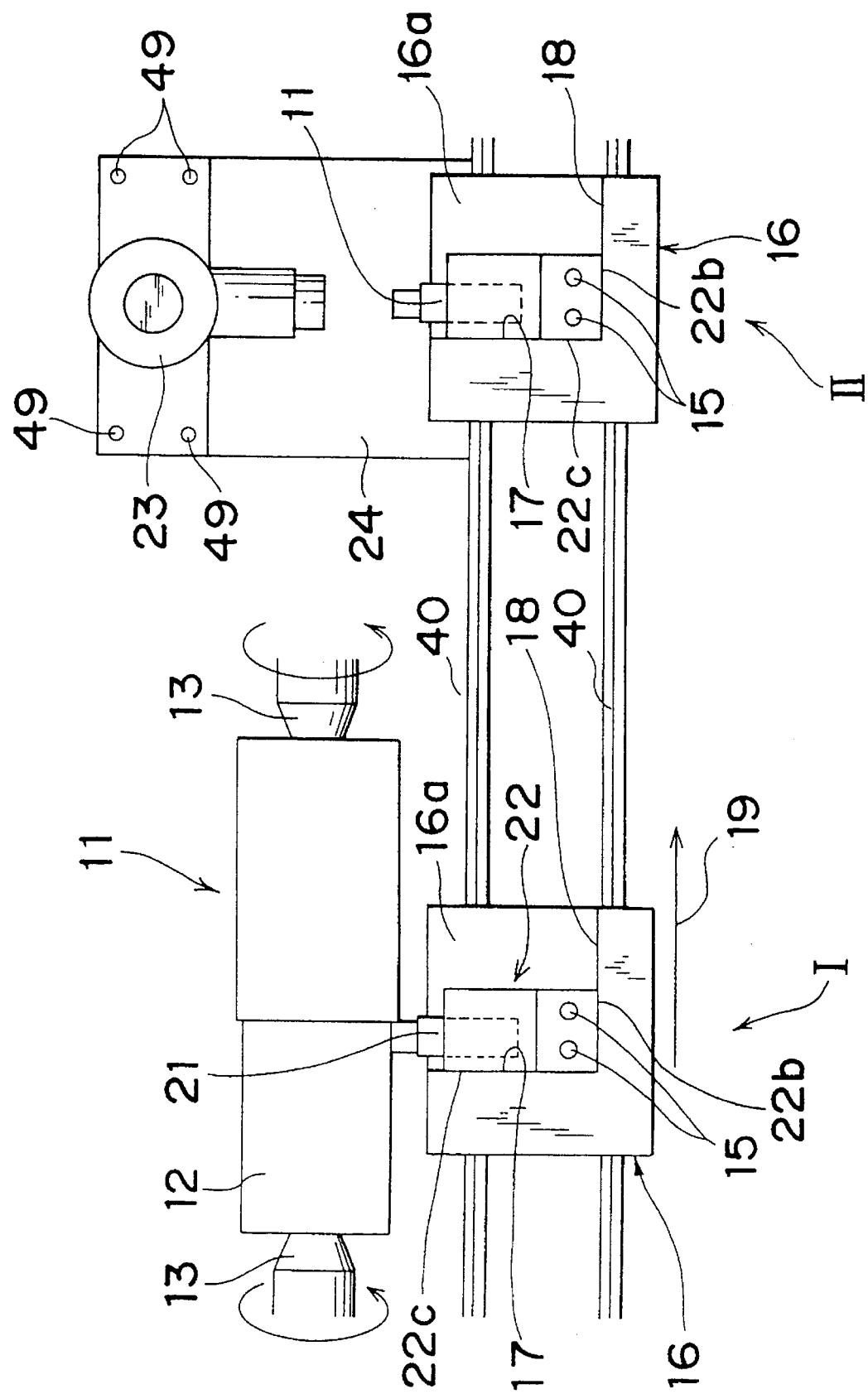
FIG. 10 is a plan view showing a processing machine having a cutting tool-setting apparatus according to still another embodiment of the present invention.

Next, another embodiment of the present invention is described below with reference to FIG. 10.

In this embodiment, the feeding table 16 to which the cutting tool holder 22 has been fixed is moved from a cutting position I to a posture adjusting position II, without removing the cutting tool holder 22 from the feeding table 16 of the processing machine 11, and then, the posture of the cutting tool 21 with respect to the cutting tool holder 22 is adjusted at the posture adjusting position II in a method similar to the above-described method, with the cutting tool holder 22 mounted on the feeding table 16 without removing the cutting tool holder 22 from the feeding table 16. Regarding the method of stopping the feeding table 16 at the posture adjusting position II, various known mechanisms capable of stopping the feeding table 16 at the posture adjusting position II can be adopted.

According to the above-described construction of the present invention, when the objective interference microscope is used as one example of the posture detecting means for detecting the posture of the cutting tool, the flank of the cutting tool for the mirror finished surface cutting is observed by the objective interference microscope after fixing the cutting tool holder in the predetermined position with respect to the objective interference microscope with the fixing means. In this manner, the cutting tool can be fixed to the cutting tool holder by adjusting the posture of the cutting tool to the posture at which the workpiece can be subjected to the mirror finished surface cutting. That is, in the objective interference microscope, an interference fringe is generated according to the dislocation amount of a position or an angle of the cutting tool with respect to the mirror finished surface-cutting position and angle of the cutting tool fixed to the cutting tool holder. Thus, the posture of the cutting tool fixed to the cutting tool holder can be accurately adjusted to the posture with good accuracy at which the workpiece can be subjected to a mirror finished surface cutting by adjusting the posture of the cutting tool with respect to the cutting tool holder so as to correct the dislocation amount. The posture of the cutting tool can be adjusted by removing the cutting tool holder from the processing machine or can be adjusted at a posture-adjusting position different from the workpiece processing position, with the cutting tool mounted on the processing machine.

As described above, according to the present invention, there are provided the cutting tool holder allowing the cutting tool to be fixed thereto in such a manner that the three-dimensional posture of the cutting tool can be adjusted; the posture detecting means for detecting the posture of the cutting tool (for example, the objective interference microscope); and the fixing means allowing the cutting tool holder to be repeatedly fixed to the same position thereof with respect to the posture detecting means with high reproducibility. Thus, the posture of the cutting tool can be adjusted without requiring skilled work.

Further, an off-line adjustment (adjustment of the cutting tool removed from processing machine) is made by adjusting the posture of the cutting tool by removing the cutting tool holder from the processing machine. The preparation of a plurality of the cutting tool holders eliminates the need for performing an adjustment operation on the processing machine. Therefore, the processing machine can be allowed to have a high operating efficiency.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as d&fined by the appended claims unless they depart therefrom.

What is claimed is:

1. A method of setting cutting tool on a processing machine for performing a cutting operation on a workpiece, said method comprising the steps of:

fixing a cutting tool to a cutting tool holder in such a manner that a posture of the cutting tool can be adjusted relative to the cutting tool holder;

fixing the cutting tool holder in a predetermined position on the processing machine using a fixing means;

reflecting light off the cutting tool, detecting the reflected light with a posture detecting means, and generating an interference fringe with the posture detecting means based on the detected light and corresponding to the posture of the cutting tool fixed to the cutting tool holder; and displaying the interference fringe on a monitor, and adjusting the posture of the cutting tool with respect to the cutting tool holder until the interference fringe displayed on the monitor coincides with a predetermined one.

2. The method as claimed in claim 1, wherein the fixing means is a fixing base for fixing the cutting tool holder in the predetermined position; and the steps of reflecting, detecting, generating, displaying, and adjusting are performed while the cutting tool holder is mounted on a processing holder separate from the processing machine.

3. The method as claimed in claim 2, wherein the predetermined interference fringe is determined by fixing a teaching cutting tool to the cutting tool holder, adjusting the posture of the teaching cutting tool with respect to the cutting tool holder such that the cutting operation can be performed on the workpiece, fixing the cutting tool holder to which the teaching cutting tool has been fixed on the processing holder, reflecting light off the teaching cutting tool, detecting the reflected light with the posture detecting means, and generating an interference fringe based on the light reflected off the teaching cutting tool, whereby the interference fringe of the teaching cutting tool is set as the predetermined interference fringe.

4. The method as claimed in claim 3, wherein the posture detecting means is an objective interference microscope.

5. The method as claimed in claim 1, wherein the predetermined interference fringe is determined by fixing a teaching cutting tool to the cutting tool holder, adjusting the posture of the teaching cutting tool with respect to the cutting tool holder such that the cutting operation can be performed on the workpiece, reflecting light off the teaching cutting tool, detecting the reflected light with the posture detecting means, and generating an interference fringe based on the light reflected off the teaching cutting tool, whereby the interference fringe of the teaching cutting tool is set as the predetermined interference fringe.

6. The method as claimed in claim 1, wherein the posture detecting means is an objective interference microscope.

7. The method as claimed in claim 1, wherein the posture of the cutting tool is adjusted with respect to the cutting tool holder with at least two sets of adjusting screws on the cutting tool holder, each set of adjusting screws being movable perpendicular to an axial direction of the cutting tool and perpendicular to another set of adjusting screws.

8. The method as claimed in claim 1, wherein the cutting tool holder has a first positioning plane extending in an axial direction thereof and a second positioning plane perpendicular to the first positioning plane, and the steps of reflecting, detecting, generating, displaying, and adjusting are performed in a processing holder separate from the processing machine, the method further comprising removably mounting the cutting tool holder on a fixing base of the processing holder such that the first positioning plane of the cutting tool holder abuts and is coplanar with a first plane of the fixing base, and the second positioning plane of the cutting tool holder abuts and is coplanar with a second plane of the fixing base.

9. The method as claimed in claim 1, wherein the processing machine includes a cutting tool holder-feeding means movable between a processing position at which the cutting operation is performed with the cutting tool and an adjusting position at which the posture of the cutting tool is adjusted with respect to the cutting tool holder using the predetermined interference fringe.

10. The method as claimed in claim 9, wherein the cutting tool holder has a first positioning plane extending in an axial direction thereof and a second positioning plane perpendicular to the first positioning plane; and the cutting tool holder-feeding means has a third plane which abuts and is coplanar with the first positioning plane of the cutting tool holder and a fourth plane which is perpendicular to the third plane and which abuts and is coplanar with the second positioning plane of the cutting tool holder.

* * * * *

UNITED STATES PATENT AND TRADEMARK OFFICE
CERTIFICATE OF CORRECTION

PATENT NO.   : 5,619,783
DATED        : April 15, 1997
INVENTOR(S)  : Nobuo YASUHIRA and Shuji UEDA It is certified that error appears in the above-indentified patent and that said Letters Patent is hereby corrected as shown below:

On the cover page, in item [73], "Matsushita Electric Industrical Co., Ltd., Osaka-fu, Japan" should read --Matsushita Electric Industrial Co., Ltd., Osaka-fu, Japan--.

Signed and Sealed this

Second Day of September, 1997

Attest:

BRUCE LEHMAN

*Attesting Officer*                *Commissioner of Patents and Trademarks*